INVENTOR.
WALTER C. JOHNSON
BY
Ralph K. Bonell
AGENT

INVENTOR.
WALTER C. JOHNSON
BY
Ralph K. Borell
AGENT

United States Patent Office 3,126,488
Patented Mar. 24, 1964

3,126,488
DIODE SWITCHING CIRCUIT FOR DELIVERING SUBSTANTIALLY UNDISTORTED SIGNALS EMPLOYING TWO CONSTANT CURRENT SOURCES

Walter C. Johnson, Princeton, N.J., assignor to General Devices, Inc., Princeton, N.J., a corporation of New Jersey Filed Nov. 2, 1959, Ser. No. 850,416
6 Claims. (Cl. 307—88.5)

This invention relates to electrical switching circuits. More particularly it refers to an improved switching circuit comprising stationary elements only which may be used to connect a plurality of branch circuits in repeated time sequences to a common radio or wire transmission path. A switching circuit of this type among other applications finds utility as a component of telemetering equipment, in the multiplexing of the transmission path between transmitter and receiver on a time division basis. In this class of service it is of paramount importance that the switching circuit pass without significant distortion the sample signals received from the branch circuits during the intervals each is connected to the common path.

A source of signal distortion in certain earlier switching circuits has been a diode interposed between the branch circuit whose signal is currently being transmitted and the common path, the location and function of this diode giving rise to the characterization of the switching circuit as a "diode gate."

Upon examination of switching circuits employing an interposed diode it will be found, in general, that the voltage drop across this diode is a variable quantity whose magnitude is a function of the signal voltage and may be nearly directly proportional to that voltage. This causes a distortion of the output signal which is chargeable to the switching circuit.

To overcome this distortion the present invention provides circuit arrangements whereby the interposed diode (or equivalent rectifier) is operated at a constant current drawn from a constant current source, it then being feasible to compensate for the voltage drop across the diode and render the signal output of the switching circuit free from errors related to the magnitude of the switched signal. At the same time that signal distortion due to changes of signal magnitude is eliminated compensation may be had for distortion due to changes of temperature, to which most crystal diodes and related rectifying elements, such as transistors, are sensitive.

As to the magnitude of the errors in prior art uncompensated interposed diode switching, the combined effect of variable current operation of the diode and changes of temperature may, in the case of silicon diodes, be of the order of 0.5 volt, which is a very appreciable fraction of the signal magnitude in some classes of service. These errors may be reduced to a value of the order of a few millivolts through the use of the circuit arrangements disclosed herein.

It is one object of the invention to provide improved means, using stationary elements, only, for connecting a plurality of input circuits, in turn, to a common transmission path.

It is another object to provide an improved switching circuit, or gate, which is capable of delivering substantially undistorted signals at the output thereof, relative to corresponding signals received as an input thereto.

It is another object to provide an improved switching circuit, or gate, whose performance is substantially independent of the amplitude of the signals passed by it and also independent of temperature changes.

It is a further object to provide a switching circuit or gate, employing rectifying elements such as diodes or transistors, in which pairs of rectifying junctions are operated at a substantially constant current in a balanced circuit, to compensate for the voltage drops across them.

Other objects and advantages of the invention will be apparent upon consideration of the following specification and of the accompanying drawings in which.

Figure 5:
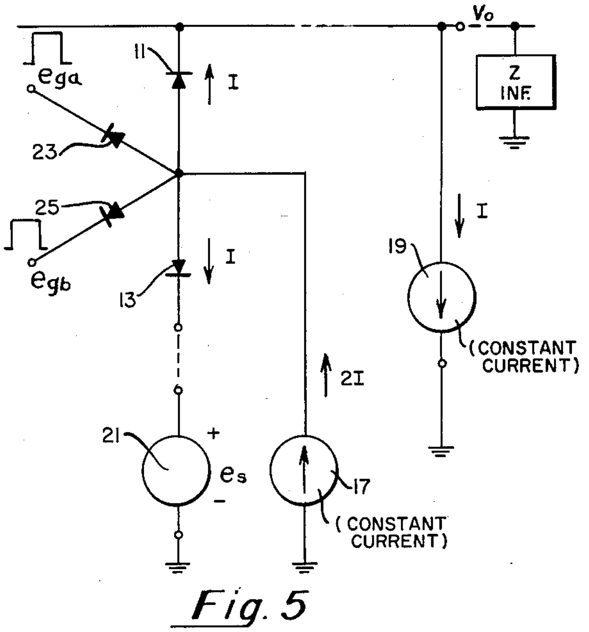
FIG. 5 shows the circuit of a plural control compensated diode switching circuit, in accordance with the principles of the invention.
Figure 6:
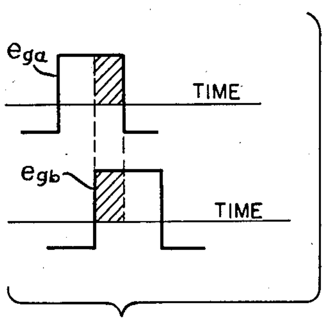
Figure 7:
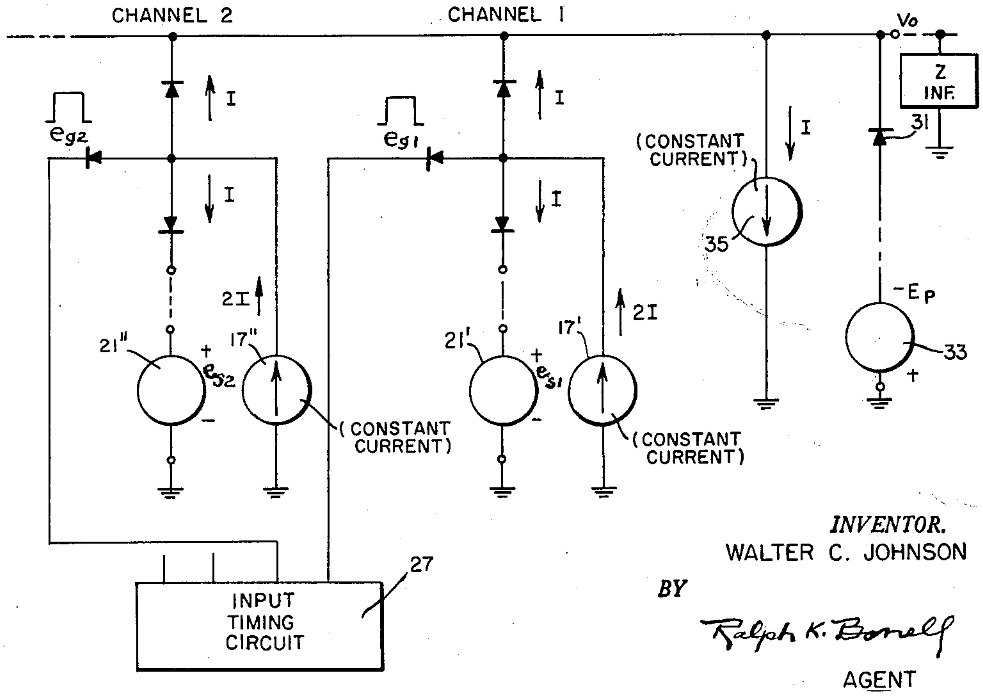

FIG. 6 comprises a pair of wave diagrams pertaining to the operation of the circuit of FIG. 5; and FIG. 7 shows a circuit for the sequential switching of a plurality of channels, in a multi-channel system.

Figure 1:
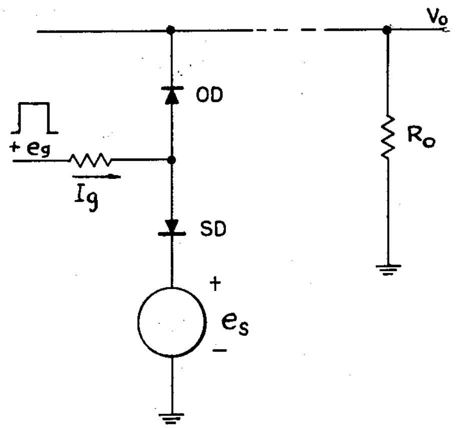
FIG. 1 is a circuit diagram showing an uncompensated diode switching circuit, for purposes of comparison.
Figure 2:
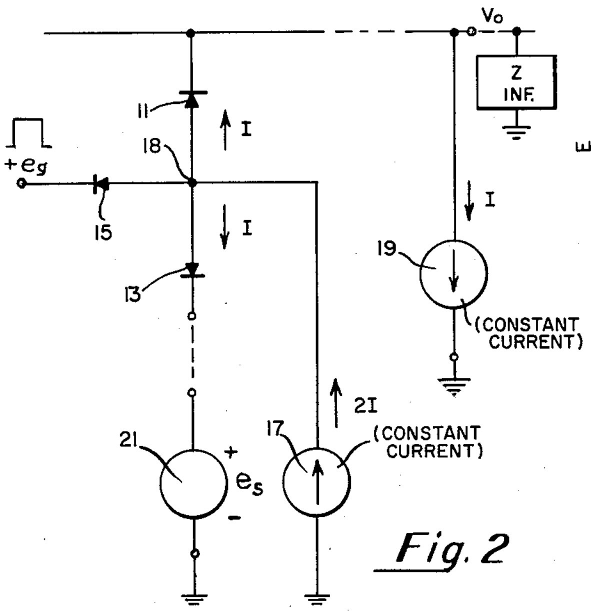
FIG. 2 is a diagram of a compensated switching circuit for the switching of a single channel, only, showing one form that the invention may take.

For purposes of direct comparison FIGS. 1 and 2 show, respectively, a representative prior art uncompensated diode switching circuit, for switching one channel only, and a circuit of the same type modified to include means for constant current operation of the diodes or other rectifiers in accordance with the principles of the present invention. In FIG. 1 there are found a switching diode SD and an output diode OD, connected in opposition together with a load resistor $R_0$. The input signal voltage is $e_s$ and the gating or switching voltage $e_g$, each supplied by an appropriate voltage source. The current supplied by the gating source is designated $I_g$. The current through the output diode OD, when conducting, is a function of the signal voltage $e_s$, as is also the voltage drop across it. Due to the manner in which this voltage drop varies with change of $e_s$ it is possible to balance it by an opposing drop across the switching diode SD at one value, only, of the signal voltage. At all other signal magnitudes an error is introduced by the switching circuit in the form of the uncompensated portion of voltage drop across OD.

In the circuit of FIG. 2, incorporating features of the invention, there is shown an output diode 11 and a switching diode 13, the two diodes being chosen to have similar operating characteristics. Diodes 11 and 13 are connected in opposition and correspond, respectively, to similar components of the circuit of FIG. 1. It will be recognized that, as in the case of FIG. 2, where two diodes are shown and described as being connected in opposition or as having a pair of like terminals connected together, they may be replaced by equivalent rectifier means such as a single transistor, particularly a symmetrical transistor, or by any other device or devices presenting a pair of opposed rectifying junctions accessible for suitable connections. Therefore, the term "diode" as used herein is not intended to limit the invention to the use of the commonly employed crystalin diodes.

Figure 3:
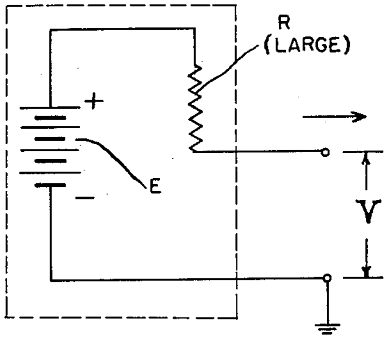
FIG. 3 is a circuit diagram of one type of constant current source.
Figure 4:
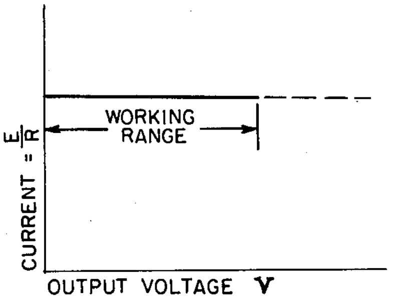
FIG. 4 is a characteristic current-voltage curve for a source of the type of FIG. 3.

In the circuit of FIG. 2 there is found, in addition to the elements of FIG. 1, an input or gating diode 15, also found in prior art circuits, and a constant current source 17, the arrow within the circle symbolizing this type of source and indicating the direction of current flow. A constant current source will also be referred to simply as a "current source," in correspondence with the use of the term "voltage source" to refer to a source of constant voltage. Examples of current sources are: a voltage in series with a large resistance (FIG. 3) the term "large" to be taken as meaning of governing value relative to the resistance of connected circuits; a pentode vacuum tube plate circuit in the region of saturation; the collector circuit of a transistor; etc. The manner in which the current supplied by the circuit of FIG. 3 varies as the voltage at the output of such a current source is varied is shown in FIG. 4. Specifically, this figure indicates a working range over which a substantially constant current output may be assumed.

In addition to current source 17 there is at the output of the switching circuit a second current source 19 passing current in the direction indicated by the arrow within the circle. The output of source 17 is applied to the junction 18 between diodes 11 and 13. There, when the diodes are conducting, it divides to supply the same constant current I to each diode, the total current supplied by source 17 being 2I. This division of current is brought about the design of current source 19 which is such as to allow one-half of the current supplied by source 17 to be conducted by output diode 11 leaving the other half to be conducted by switching diode 13. Constancy of current and equality of the voltage drops across the two diodes resulting from the similarity of their operating characteristics over a chosen favorable range, make it possible to effect a cancellation of one drop against the other over a considerable range of signal values in the balanced circuit of FIG. 2. The output voltage $v_o$, ideally, then becomes equal or directly proportional to the signal voltage $e_s$ supplied by source 21, which may be but is not necessarily unidirectional.

A close approximation to ideal conditions can be attained in practical circuits, particularly if diodes 11 and 13 are selected in pairs. It may be noted here as an advantage of the invention that the diodes in a multichannel system need not be matched in higher numbers. As an additional feature of the compensation process, by mounting the two diodes in close proximity, one to the other, they will experience the same temperature variations and the like voltage variations due to this cause, with matched diodes, also will be substantially annulled in the balanced circuit of FIG. 2. It is assumed that the switching circuit is terminated by or operates into a high impedance which may be considered infinite for analytical purposes, as indicated by the box bearing the legend "Z INF."

In the circuit of FIG. 2 conduction through output diode 11, and switching diode 13, occurs and the channel is turned "on" when gating diode 15 is supplied with a positive voltage $e_g$ greater than $e_s$ plus the forward voltage drop in switching diode 13. This inhibits conduction through diode 15, this diode then operating as an open switch, and junction 18 is brought to the necessary positive potential to cause diodes 11 and 13 to conduct. These diodes then, as referred to above, pass equal constant currents of the value I by division between them of the current 2I supplied by current source 17, resulting in the mutual cancellation of the opposite voltage drops across the diodes and the appearance of the true or substantially undistorted signal voltage at the output terminals, regardless (within the operating range) of the value of that voltage. Conversely, when diode 15 is supplied with a negative potential conduction through it occurs and when junction 18 thus acquires a more negative potential than either $e_s$ or $v_o$ conduction through diodes 11 and 13 is prevented and the channel is turned "off." With control of the effective gating voltage between its two operating values by any suitable means, therefore, a sequence of "square" waves constituting accurate samples of the input or channel signal is obtained at the output of the switching circuit. When the channel is turned off the current through signal source 21, which is due to diode back leakage, can be very small, of the order of a few microamperes.

The circuit of FIG. 2 illustrates arrangements for connecting a single input circuit, only, to a chosen output circuit or to the switching of a single channel, by means of suitable variations of a single gating voltage $e_g$. FIG. 5 illustrates the use of more than one gating voltage while FIG. 7 illustrates a circuit for switching in sequence the channels of a multi-channel system. There is no specific limitation on the number of gating diodes and gating voltages than can be employed per channel. FIG. 5 shows two gating rectifiers 23 and 25 receiving voltages $e_{ga}$ and $e_{gb}$, respectively, and FIG. 6 shows assumed amplitudes of these voltages and an assumed spacing in time. The single channel of FIG. 5 will be turned on whenever the two gating voltages are simultaneously sufficiently positive to block conduction in diodes 23 and 25, as indicated by the cross-hatched overlapping areas of FIG. 6 and will be turned off when either is negative to the degree allowing conduction, as noted above. A wide variety of control circuits may be employed.

In FIG. 7 there are shown circuit means for switching two channels, the circuit for switching each channel being similar to that of FIG. 2. This is by way of illustration of arrangements for switching any number of channels or input circuits to a common output circuit. Sources 17′ and 21′ in channel 1 and 17″ and 21″ in channel 2 correspond, respectively, to sources 17 and 21 in FIGS. 2 and 5. While only a single gating diode is shown for each channel the use of plural diodes as in the circuit of FIG. 5 is within the scope of the invention. The only requirement is that effective gating signals $e_{g1}$, $e_{g2}$, etc. be applied to the several switching circuits having at suitable times the requisite values to turn on and off the channels in the desired sequence and at the desired spacing in time. This function is performed by input timing circuit 27 in the arrangements of FIG. 7. This timing circuit may take a variety of known forms, the invention not being concerned with the detailed design thereof. In one form the desired spaced impulses may be derived from a binary counting chain.

An added feature is found in the circuit of FIG. 7 which does not appear in the single channel circuit of FIG. 2. This is clipping diode 31 biased by a negative voltage $-E_p$ derived from source 33. The purpose of this diode is to limit the negative excursions of the switching circuit output voltage $v_o$. If all channels are simultaneously switched off the output voltage may go unduly negative, particularly if there is an appreciable time between the switching of the channels. Diode 31 acts as a clipper to prevent this, $-E_p$ being the "pedestal" voltage.

It is to be noted that in a multi-channel switching circuit such as is shown in FIG. 7 since only one channel is "on" at a time only one terminal current source is required, as source 35 in FIG. 7 corresponding to source 19 in FIG. 2, in order to cause the output diode of the "on" channel to draw one-half of the current supplied by the constant source of that chanel, as source 17′ in channel 1.

The circuit disclosed herein will operate successfully if the polarities of all the rectifiers are reversed, the direction of the currents supplied by current sources are reversed and the polarities of the gating voltages are reversed. In addition, a circuit of the type of FIG. 7 may be used in reverse manner to switch a single circuit to a plurality of output circuits, in turn.

While a preferred form of the invention has been described herein this is by way of illustration and not by way of limiting the scope of the invention as defined in the following claims.

What is claimed is:

1. In a circuit arrangements for switching the signals of a plurality of input circuits in sequence to a common output circuit the combination of an output circuit, a timing circuit, and a plurality of like input circuits controlled by said timing circuit, each input circuit comprising a source of input signals, first and second rectifiers having similar operating characteristics and having a pair of like terminals thereof connected together at a junction, said first rectifier having the other terminal thereof connected to said source of input signals and said second rectifier having the other terminal thereof connected to said common output circuit, a source of constant current connected to said junction, and a further connection to said junction from said timing circuit, said timing circuit supplying thereby to said junctions in the several input circuits for predetermined periods and in selected sequence a voltage permitting current conduction by said rectifiers and at other times supplying a voltage inhibiting conduction, together with means causing the two rectifiers of each input circuit during their conducting periods to pass equal constant currents including a further source of constant current connected across the common output circuit and designed to draw through said second rectifier of each input circuit, when conducting, one-half of the total current supplied to said junction between the two rectifiers by the constant current source connected thereto, whereby equal and opposite voltage drops at a constant current are established across the two rectifiers of an input circuit which annul one another and allow the true voltage of a switched signal to be transmitted to the common output circuit independently of the value of the voltage, within an operating range.

2. The combination defined in claim 1 wherein said common output circuit includes as a clipping means a series combination of a constant voltage source and a rectifier bridged across the circuit.

3. In a switching circuit the combination of a source of an input signal, an output circuit to which samples of said signal are to be switched, said output circuit being terminated in a high impedance relative to that of circuits connected thereto, intermediate circuit means comprising first and second rectifiers having similar operating characteristics and having a pair of like terminals thereof conneced together at a junction, said first rectifier having the other terminal thereof connected to said input signal source to receive said signal and said second rectifier having the other terminal thereof connected to said output circuit, a source of constant current connected to said junction, and means for selectively varying the potential of said junction between two values respectively inhibiting and permitting current conduction by said rectifiers, and circuit means causing an equal division between the two rectifiers, when conducting, of the constant current received at said junction from said constant current source, including a second source of constant current connected across the output circuit and designed to draw through said second rectifier one-half of the current received at the junction, whereby equal and opposite voltage drops are established across the two rectifiers when conducting which annul one another and allow the true voltage of a switched input signal to be transmitted to the output circuit independently of the value of the voltage, within an operating range.

4. In a switching circuit the combination of a source of input signals, an output circuit to which said signals are to be switched, intermediate circuit means comprising first and second rectifiers having similar operating characteristics and having a pair of like terminals thereof connected together at a junction, said first rectifier having the other terminal thereof connected to said source and said second rectifier having the other terminal thereof connected to said output circuit, a source of constant current connected to said junction, means for selectively maintaining said junction either at a potential inhibiting or a potential permitting conduction simultaneously by said rectifiers, and means comprising a second constant current source controlling the current passed by said second rectifier to cause an equal division of current from said first constant current source between the two rectifiers.

5. In a switching circuit the combination of a pair of terminals for making connection to input and output means, respectively, a pair of rectifiers connected in opposition therebetween, a first source of constant current connected to a circuit point intermediate said rectifiers, means controlling the potential of said point relative to the potentials of said terminals to control conduction of current from said source by said rectifiers, and a second constant current source constructed and connected to establish the value of current passed by one of said rectifiers when conducting at one-half the value of the current supplied by said first source, an equal current then being passed by the other rectifier.

6. In a switching circuit the combination of a group of at least three rectifiers having terminals of like character connected to a common junction, a source of an input signal potential connected to the other terminal of one of said rectifiers, a first constant current source connected to supply current to said junction, a second constant current source connected to receive current at the other terminal of a second of said rectifiers, and individual sources of switching potential respectively connected to the other terminals of the remaining rectifiers for controlling the conducting state of said first two rectifiers, said second constant current source being constructed to pass one-half the current supplied to said junction by said first constant current source when said first two rectifiers are in a conducting state.

References Cited in the file of this patent

UNITED STATES PATENTS

| | | |
|---|---|---|
| 2,557,729 | Eckert | June 19, 1951 |
| 2,576,026 | Meacham | Nov. 20, 1951 |
| 2,657,318 | Rach | Oct. 27, 1953 |
| 2,760,160 | Flood et al. | Aug. 21, 1956 |